United States Patent [19]

Yaklin

[11] Patent Number: 4,986,559

[45] Date of Patent: Jan. 22, 1991

[54] TRAILER WHEEL PIVOTING SYSTEM

[76] Inventor: Richard O. Yaklin, 22514 Stephens, St. Clair Shores, Mich. 48080

[21] Appl. No.: 296,089

[22] Filed: Jan. 11, 1989

[51] Int. Cl.⁵ .............................................. B60P 3/06
[52] U.S. Cl. .................................. 280/402; 280/490.1; 414/530
[58] Field of Search ................... 280/402, 490.1, 418, 280/475, 292, 656, 476.1; 414/537, 538, 430, 427, 495, 563

[56] References Cited

U.S. PATENT DOCUMENTS

| | | | |
|---|---|---|---|
| 2,541,582 | 2/1951 | Hawkins | 280/476.1 |
| 2,701,069 | 2/1955 | Hawkins | 280/402 |
| 2,773,696 | 9/1953 | George | 280/402 |
| 3,035,856 | 2/1960 | Mleczko et al. | 280/490.1 |
| 3,311,245 | 2/1965 | Galey | 414/537 |
| 3,653,680 | 4/1972 | Denny | 414/538 |
| 3,979,137 | 9/1976 | Lipscomb, Jr. et al. | 280/402 |
| 4,118,047 | 10/1978 | Neasham | 414/430 |
| 4,147,373 | 4/1979 | Cully | 280/402 |
| 4,483,549 | 11/1984 | Nikawa | 280/402 |
| 4,822,069 | 4/1989 | Burgess | 280/402 |

FOREIGN PATENT DOCUMENTS

| | | | |
|---|---|---|---|
| 926738 | 5/1963 | United Kingdom | 280/402 |
| 1488277 | 10/1977 | United Kingdom | 280/402 |

Primary Examiner—Charles A. Marmor
Assistant Examiner—A. M. Boehler
Attorney, Agent, or Firm—Peter D. Keefe

[57] ABSTRACT

A trailer wheel pivoting system having provision for pivoting of a wheel assembly with respect to an attached trailer frame, accomplished by providing a wheel frame, an axle attached to the wheel frame, road tires attached to the axle, and an apertured cross-bar attached centrally to an upper part of the wheel frame. Various forms of trailer devices are then combined with the aforesaid trailer wheel assembly. In a first embodiment of the present invention, an automobile tow trailer is provided by placing a trailer frame for supporting an automobile onto the wheel assembly, the trailer support frame being provided with a pair of automobile wheel cradles. A pivot pin bolt is inserted through a central aperture in the trailer frame and the aperture in the cross-bar in order to pivotably secure the trailer support frame to the wheel assembly. In a second embodiment, the wheel assembly may serve as an aid for towing trailers. In a third embodiment, the wheel assembly serves as the front wheels of a front and rear wheeled trailer. In a fourth embodiment, the wheel assembly is pivotably connected at the cross-bar to a dump trailer assembly.

6 Claims, 3 Drawing Sheets

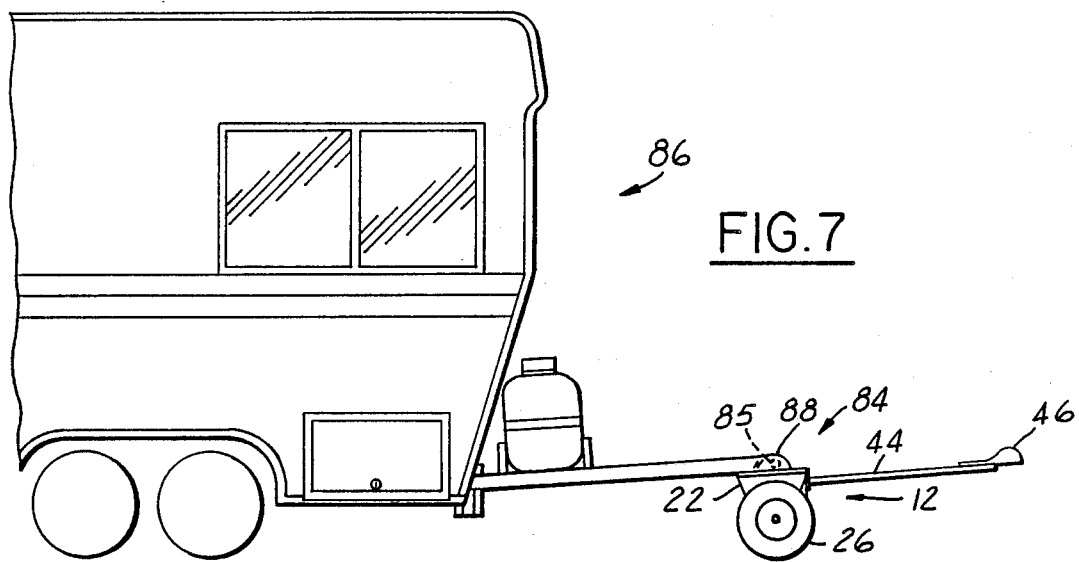
FIG.7
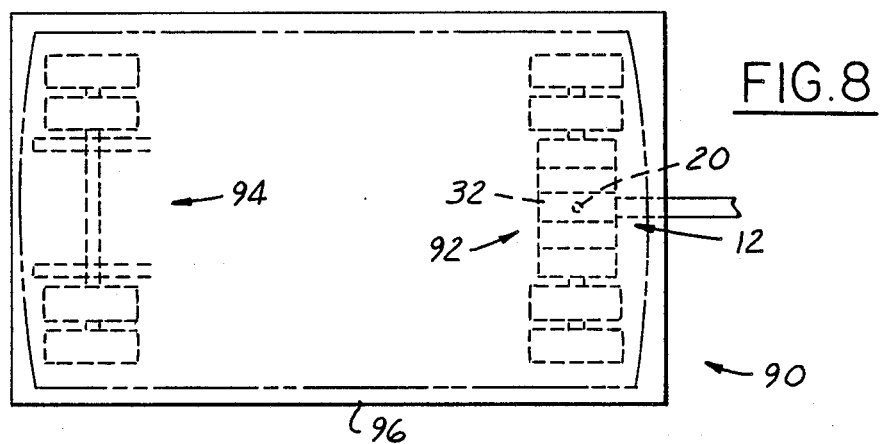
FIG.8
FIG.9
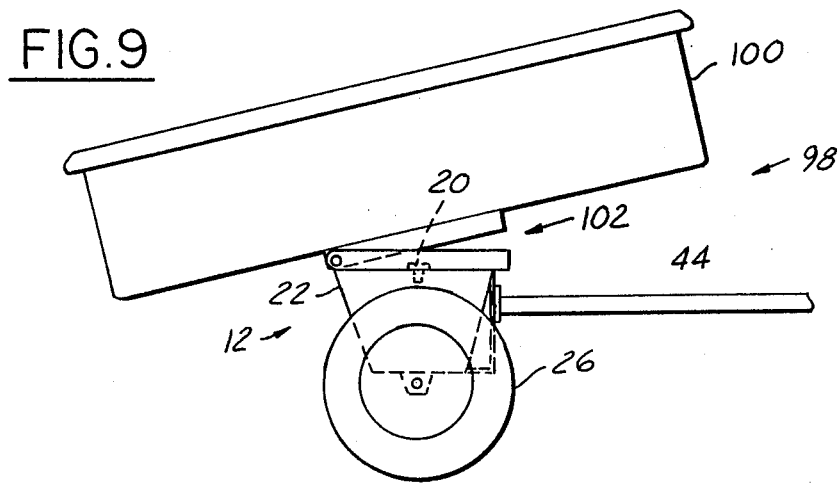

TRAILER WHEEL PIVOTING SYSTEM

BACKGROUND OF THE INVENTION

1. Field of the Invention

The present invention relates to trailers, particularly to a device for permitting pivoting between the support frame of the trailer and the front wheel assembly of the trailer with which the tow bar is attached. The invention still more particularly relates to tow trailers for towing disabled automobiles, in which the trailer frame for supporting the disabled automobile may pivot relative to the trailer wheel assembly of the trailer, no matter how close to the ground the tires of the supported disabled automobile may be, and further, in which the wheels of the trailer are located inside the support frame for the disabled automobile.

2. Description of the Prior Art

Transportation of disabled automobiles is frequently very costly because expensive tow trucks are required. Consequently, it would be very desirable if the owner of the disabled automobile could, himself, transport his automobile without having to resort to a tow truck. What is needed, therefore, is a trailer device which is relatively inexpensive and can safely and effectively permit an individual car owner to transport his car by being towed by another car.

In the prior art, several concepts for solving this disabled motor vehicle transport problem have been forwarded. Hawkins U.S. Pat. No. 2,541,582 dated Feb. 13, 1951 discloses an automobile tow trailer having a tow bar, a frame pivotally connected to the tow bar, and a pair of automobile wheel supports pivotably linked to the frame. Hawkins U.S. Pat. No. 2,701,069 dated Feb. 1, 1955 discloses an automobile tow trailer similar to his other patent, now featuring a winch and lift arm. Lipscomb, Jr. et al U.S. Pat. No. 3,979,137 dated Sept. 7, 1976 discloses a tow trailer for motorcycles in which a single cradle for a motorcycle wheel is pivotable with respect to the trailer frame. Cully U.S. Pat. No. 4,147,373 dated Apr. 3, 1979 discloses a rough terrain transportation trailer particularly suited for use with tractors in which a pair of tractor wheel cradles are provided on the trailer frame and the trailer wheels and tow bar can pivot in relation to the trailer frame.

In the closest known prior art, U.S. Pat. No. 4,483,549 dated Nov. 20, 1984, inventor Nikawa discloses an automobile transportation trailer having a frame, a tow bar rigidly connected to the frame and a pair of automobile wheel cradles connected by a platform that is pivotable in relation to the frame.

In the prior art there remains the problem that each of these solutions is complicated and expensive. Nikawa is particularly complicated and expensive, and suffers from the need to have the lowermost portion of the cradles located at a position above the uppermost elevation of the trailer wheels in order to permit pivoting. Further, there is the significant problem remaining in all of the above recounted prior art devices in that there is no provision, in combination, for: (1) placing the wheel cradles close to ground level to accommodate a low center of gravity and ease of loading of the car, (2) having the trailer wheels inside the location of the wheel cradles to ensure a minimum of trailer width to ease transportation on the highway, and (3) allowing the cradle platform to pivot relative to the trailer frame even though the cradles are located lower to the ground than the diameter of the trailer wheels.

The present invention is particularly directed to providing an automobile transport trailer that has each of these provisions and achieves this result inexpensively, with an uncomplicated structure.

SUMMARY OF THE INVENTION

The present invention is a trailer wheel pivoting system having provision for pivoting of a wheel assembly with respect to an attached trailer frame. This is particularly accomplished by providing a wheel assembly frame, an axle attached to the wheel assembly frame, road tires attached to the axle, and an apertured cross-bar attached centrally to an upper part of the wheel assembly frame. Various forms of trailer devices are then combined with the aforesaid trailer wheel assembly.

In a first embodiment of the present invention, an automobile tow trailer is provided by placing a trailer support frame onto the trailer wheel assembly, the trailer support frame being provided with a pair of wheel cradles for the wheels of a vehicle to be towed. In this first embodiment, the trailer support frame is in the shape an elongated plate with a central aperture; a pivot pin bolt is inserted through the central aperture and the aperture in the cross-bar of the wheel assembly frame in order to pivotably secure the trailer support frame to the wheel assembly. In a second embodiment of the present invention, the wheel assembly may serve as an aid for towing trailers, in that the wheel assembly frame has a hitch ball located at the aperture in the cross-bar for accepting the hitch of the trailer. In this way, the weight of the trailer is placed on the wheel assembly and not on the tow vehicle that in turn attaches to the tow bar of the wheel assembly. In a third embodiment of the present invention, the wheel assembly serves as the front wheels of a front and rear wheeled trailer, the wheel assembly being pivotably attached to the trailer at the cross-bar via a pivot pin. In a fourth embodiment of the present invention, the wheel assembly is pivotably connected, via a pivot pin, at the cross-bar to a dump trailer assembly. In this last embodiment, the dump trailer is pivotable about the aperture in the cross-bar as well as being conventionally pivotable for dumping.

Accordingly, it is an object of the present invention to provide a wheel pivoting system for a trailer composed of a wheel assembly having provision for being pivotably attachable to the frame of the trailer.

It is a further object of the present invention to provide an automobile tow trailer which includes a pivotable relationship between the trailer frame and the wheel assembly.

It is still a further object of the present invention to provide an automobile tow trailer which includes a pivotable relationship between the trailer frame and the wheel assembly and in which the cradles for supporting a disabled automobile are low to the ground such that the lowermost portion of the cradles are below the uppermost portion of the road wheels of the wheel assembly, and further where the road wheels of the wheel assembly are located between the cradles.

It is yet another object of the present invention to provide a pivotable wheel assembly for a trailer frame in which the wheel assembly is structurally simple and inexpensive.

It is still another object of the present invention to provide a pivotable wheel assembly for a trailer frame, the trailer frame being selected from all manner of trailer types.

These, and additional objects, advantages, features and benefits of the present invention will become apparent from the following specification.

BRIEF DESCRIPTION OF THE DRAWINGS

FIG. 7 is a side view of a second embodiment of the present invention in which the wheel assembly pivotably couples to the hitch of the trailer.

FIG. 8 is a part sectional plan view of a third embodiment of the present invention in which the wheel assembly is used as the pivotable front wheels of a trailer.

FIG. 9 is a part sectional side view of a fourth embodiment of the present invention in which the wheel assembly is pivotably attached to a dump trailer.

DETAILED DESCRIPTION OF THE PREFERRED EMBODIMENTS

Figure 1:
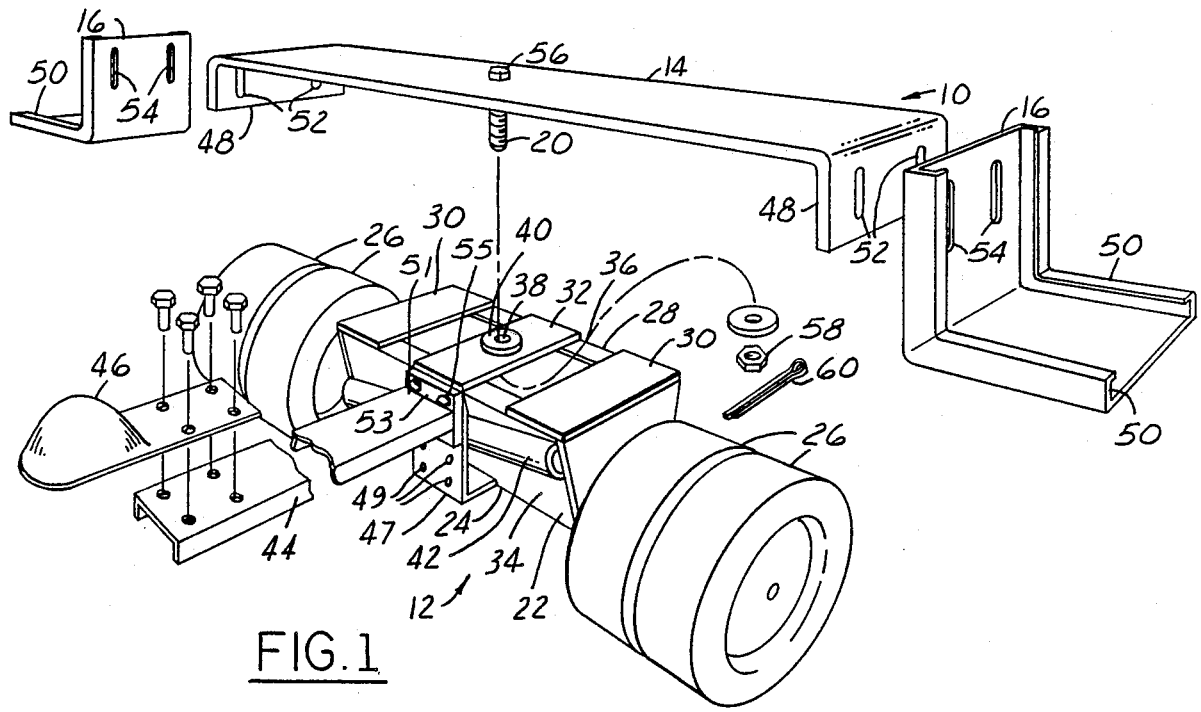
FIG. 1 is an exploded perspective view of the present invention in operation according to a first embodiment of the present invention.
Figure 2:
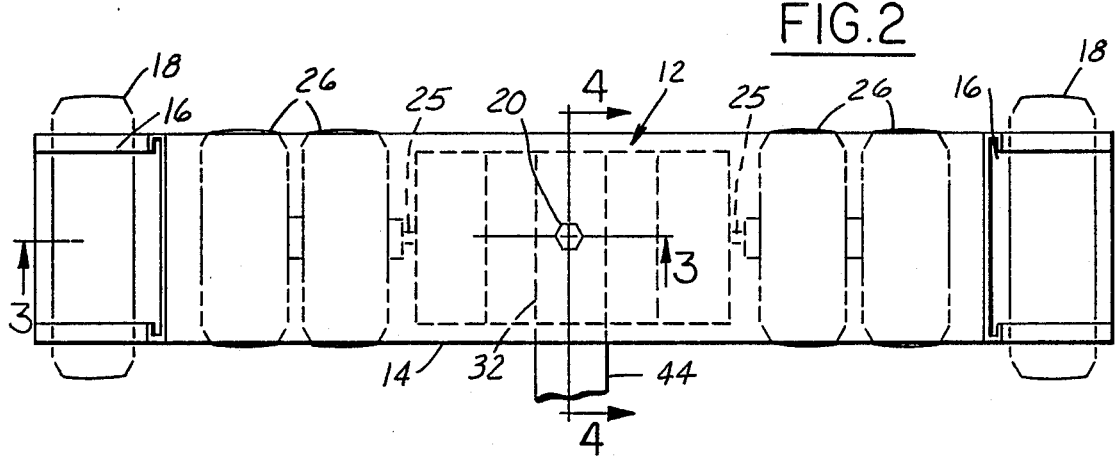
FIG. 2 is a part sectional plan view of the first embodiment of the present invention as depicted in FIG. 1, including two wheels of a disabled automobile located on the cradles.

Referring now to the drawings, FIGS. 1 and 2 show a first embodiment of the trailer wheel pivoting system according to the present invention in the form of a tow trailer 10, in which a wheel assembly 12 is pivotably connected with a trailer frame 14. The trailer frame 14 is structured for towing of a vehicle, such as, but not restricted to, a disabled automobile, by the placement a front or rear set of the vehicle's wheels 18 on the cradles 16. The wheel assembly 12 is pivotal with respect to the trailer frame by virtue of a pivot pin 20, which serves to pivotably hold together the wheel assembly 12 with the trailer frame 14.

The wheel assembly 12 is composed of a wheel assembly frame 22 having preferably, but not necessarily, an elongated, generally tapered box shape. At the tapered lower end 24 of the wheel assembly frame 22 is attached an axle 25. It is preferred to attach, with conventional bearing mechanisms, two road tires 26 to each end of the axle 25, although the number could be more or less than this as particular end uses may dictate or permit according to safe loading factors. The upper end 28 of the wheel assembly frame 22 is preferred to be open and have two reinforcing plates 30 at either end thereof. A cross-bar 32 is provided at the center of the upper end 28 of the wheel assembly frame 22, the cross-bar extending from and attached to the front side 34 and the rear side 36 of the wheel assembly frame. An aperture 38 is provided in the cross-bar at a location which is determined by where an imaginary, perpendicular line may be drawn from the cross-bar to the axle 25. A reinforcing-spacer ring 40 may be included to add strength at the aperture 38, and, importantly, as a spacer at the pivot pin between the cross-bar and an attached trailer frame so as to minimize friction therebetween during pivoting. Further, reinforcing structures 42 may be added to the front and rear sides 34, 36 in order to stiffen the wheel assembly frame 22. A tow bar 44 is attached to the wheel assembly frame 22 at the front side 34 and in alignment with the aperture 38 of the cross-bar 32. The end of the tow bar 44 remote from the wheel assembly frame includes a hitch mechanism 46 of conventional structure and function. It is preferred that the tow bar 44 be attached at a location on the wheel assembly frame 22 so that when the hitch mechanism 46 is received over a ball (not shown) on a prospective tow vehicle (not shown) the attitude of the wheel assembly 12 will be such that the cross-bar 32 is substantially level with respect to the ground. This is preferred to be accomplished by including a tow bar attachment plate 47 connected to the wheel assembly frame in perpendicular relation with respect to the cross-bar 32. A series of apertures 49 are included in the tow bar attachment plate 47. The end 51 of the tow bar 44 includes a height adjustment plate 53 having apertures 55; the height adjustment plate is structured so that the apertures 55 may selectively align with the apertures 49 in the tow bar attachment plate 47. A user may selectively adjust the attitude of the wheel assembly 12 when it is hitched to a tow vehicle by bolting the height adjustment plate 53 at a selected location on the tow bar attachment plate 47. It should be noted that it is also possible to simply provide a plate across the upper end 28 of the wheel assembly frame 22, in which case the entire plate would then constitute the cross-bar and the aperture would be centered as described above.

The trailer frame 14 is constructed of an elongate metal plate having a perpendicular flange 48 at each end. Attached to each perpendicular flange is a cradle 16. The cradles 16 are preferred to be provided with lips 50 on either side. The lips serve to retain and center a wheel 18 when it is placed onto the cradle. It is further preferred to provided for adjustable positioning of the cradles 16 relative to the perpendicular flanges. This can be accomplished by elongate holes 52, 54 on both the perpendicular flanges and the cradles so that they may be selectively held together, by common fasteners such as bolts 57, at desired relative positions. By incorporation of this feature, the height of the cradles 16 above the ground may be adjusted. At the center of the trailer frame 14 is an aperture 56. Through this aperture is inserted a pivot pin 20. A preferred form of pivot pin 20, as shown in FIG. 1, is a bolt.

Figure 3:
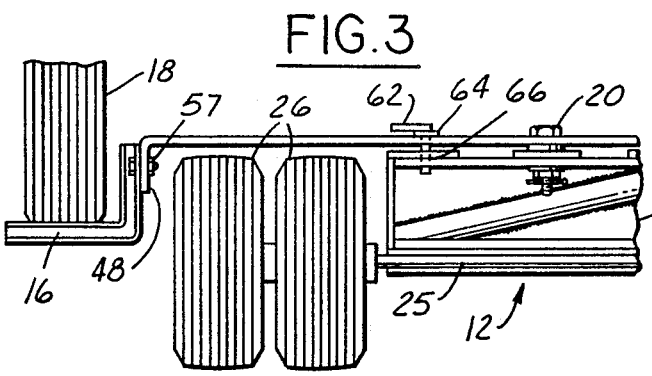
FIG. 3 is a detail front view of the first embodiment of the present invention as seen along lines 3—3 in FIG. 2.
Figure 4:
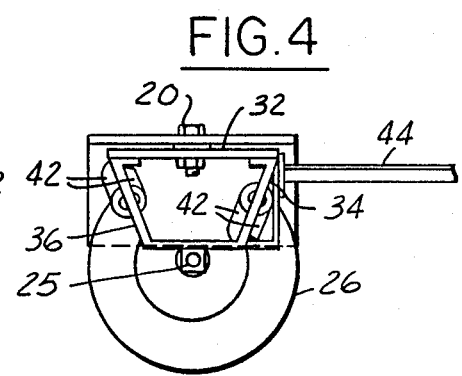
FIG. 4 is a part sectional side view of the first embodiment of the present invention as seen along lines 4—4 in FIG. 2.

The tow trailer 10 is assembled as follows. With the trailer frame 14 held so that the perpendicular flanges 48 project toward the wheel assembly 12, the trailer frame is placed on the upper end 28 of the wheel assembly frame 22, the trailer frame 14 resting on reinforcing-spacer ring 40 of the cross-bar 32 and the reinforcing plates 30. Thereupon, the pivot pin 20 is inserted through the aperture 56 in the trailer frame and the aperture 38 in the cross-bar 32, then secured therethrough by screwing on a nut 58 and thereafter inserting thereinto a safety cotter pin 60. The result of such assembly can be understood with reference to FIGS. 3 and 4. FIG. 3 depicts the trailer frame 14 in place above the wheel assembly 12, with pivotable connection provided by the pivot pin 20. It will be noted that a pivot stop pin 62 selectively projects through apertures 64 and 66 in the trailer frame and the wheel assembly, respectively, the purpose of the pivot stop pin 62 will be described below.

Figure 5:
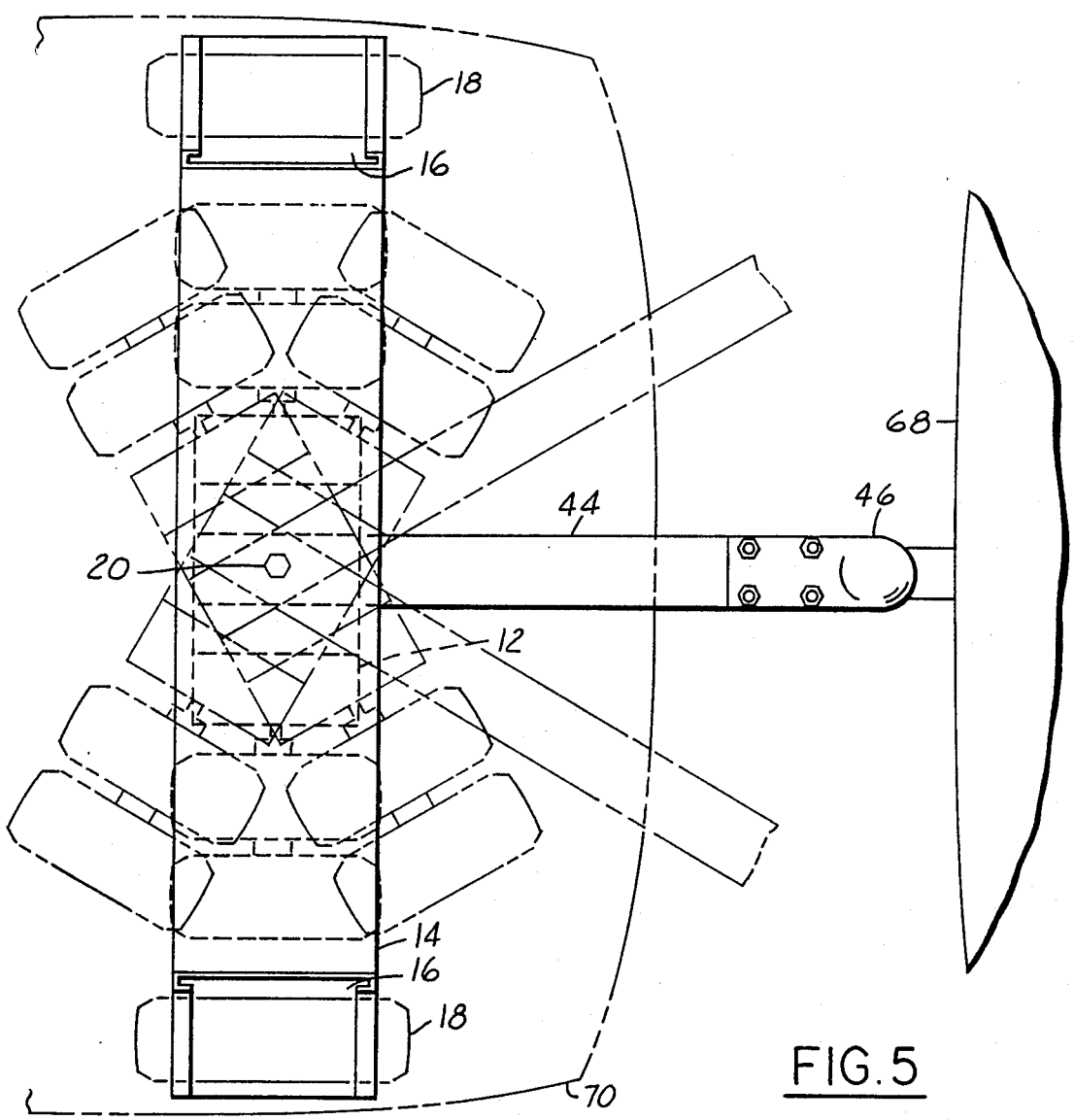
FIG. 5 is a part sectional plan view of the first embodiment of the present invention as in FIG. 2, showing in phantom two pivot derived orientations of the wheel assembly relative to the trailer frame.

FIG. 5 shows several of the various positions of the wheel assembly 12 relative to the trailer frame 14 that are possible based upon pivoting about the pivot pin 20. In FIG. 5 the hitch mechanism 46 is connected with a ball on a tow vehicle 68. Also, FIG. 5 shows in phantom lines a disabled motor vehicle 70, the wheels 18 of which are located in the cradles 16.

Figure 6:
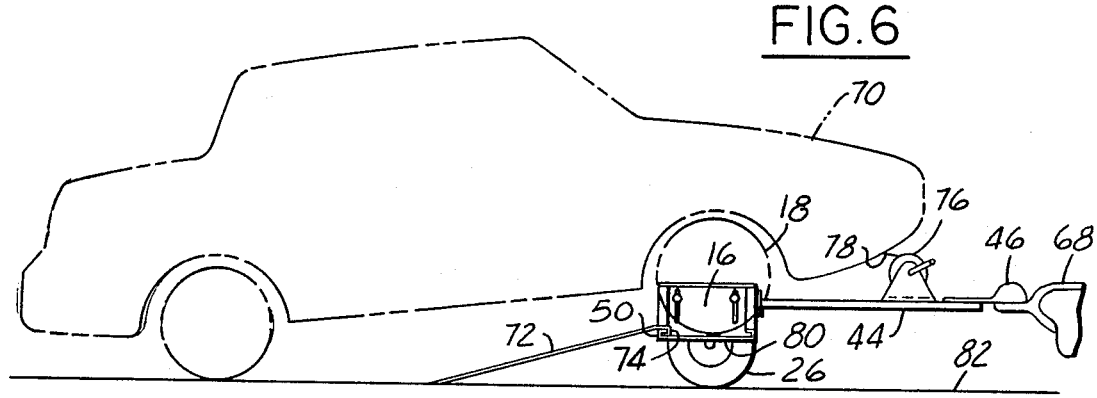
FIG. 6 is a side view of the first embodiment of the present invention in operation with a disabled automobile having been just loaded onto the cradles.

Operation of the tow trailer 10 according to the first preferred embodiment of the present invention will now be discussed. It will be seen from FIG. 6 that an automobile 70 has been placed upon the tow trailer 10 by placement of its front wheels 18 onto the cradles 16. It is preferred during loading to prevent the trailer frame 14 from being pivotable relative to the wheel assembly 12 in order to ensure uniform and orderly loading of each of the wheels 18 onto the cradles 16. This is easily accomplished by temporarily placing the pivot stop pin 62 into the apertures 64 and 66. When loading is completed, the stop pivot pin 62 is removed in order to restore full pivot function to the tow trailer 10. Loading (and unloading) of the wheels 18 of the disabled motor vehicle 70 is accomplished preferably by use of removable ramps 72, the ramps having an upper lip 74 which releasably hooks over the lip 50 of the cradle 16. It is further preferred to utilize a winch crank 76, which is attached to the tow bar 44, in order to pull the automobile 70 up the ramps 72 by winching of a cable 78 releasably attached to the disabled motor vehicle 70. It will be seen from FIG. 2 that the road tires 26 of the wheel assembly 12 are located between the cradles 16. As such, the width of the tow trailer 10 is minimized and the cradles may be located close to the ground as desired, since the cradles have no axle or road tire obstructions beneath them. Further, it will be seen from FIG. 6 that the lowermost point 80 of the cradles 16 is located significantly below the uppermost point of the road tires 26 of the wheel assembly 12. Indeed, the only restraint limiting how close to the ground 82 the cradles can be located is based solely upon the possibility of the cradles hitting road irregularities while towing; no matter how close the cradles are to the ground, pivoting, as shown in FIG. 5, is unaffected. This feature is important in that the center of gravity of a towed vehicle, as well as loading and unloading effort, is minimized by having the cradles as close to the ground as possible.

FIGS. 7 through 9 show the wheel assembly in operation with various other types of trailers. These alternative embodiments are intended to be exemplary of the many kinds of applications of the trailer wheel pivoting system according to the present invention as may occur to those who are skilled in the art to which the present invention is directed.

FIG. 7 shows a second embodiment of the trailer wheel pivoting system according to the present invention in the form of a trailer towing aid 84. The trailer towing aid is composed of the wheel assembly 12 as disclosed above, now with the addition of a conventional hitch ball 85 fastened to the cross-bar 32 at the aperture 38. In operation, the trailer 86 is hitched to the aforesaid hitch ball 85 on the cross-bar 32. A tow vehicle can then tow the trailer 86 through use of the hitch mechanism 46 on the tow bar 44. It is to be understood that a main advantage to be derived from use of the trailer towing aid 84 with a trailer 86 occurs when the trailer 86 is unbalanced so that a substantial amount of downwardly directed force is loaded at the trailer hitch 88; it is well known in the art that under such loading conditions, the tow vehicle can experience untoward downward directed forces at the hitch. Under such conditions, the trailer towing aid 84 will eliminate any downward loading on the tow vehicle.

FIG. 8 shows a third embodiment of the trailer wheel pivoting system according to the present invention in the form of a utility trailer 90 having two sets of wheels, a front set 92 and a rear set 94, in which the front set is pivotable relative to the trailer frame 96. The rear set of wheels 94 is attached to the trailer frame 96 in a fixed relative orientation, as shown. The front set of wheels 92 are provided by the wheel assembly 12, as has been disclosed above in the first preferred embodiment. The wheel assembly 12 is connected to the trailer frame 96 via the pivot pin 20 in the same manner as the trailer frame 14 is connected to the wheel assembly 12 in the first preferred embodiment.

FIG. 9 shows a fourth embodiment of the trailer wheel pivot system according to the present invention in the form of a dump trailer 98 having a dump box 100 and a pivotable dumping frame 102. The pivotable dumping frame 102 connects in fixed relationship with the dump box 100 and, via the pivot pin 20, pivotably to the wheel assembly 12 in the manner as hereinabove described.

To those skilled in the art to which this invention appertains, the above described preferred embodiments may be subject to change or modification. For instance, the wheel assembly 12 can be used in many other types of trailers consistent with the structural and operational considerations hereinabove described. Such change or modification can be carried out without departing from the scope of the invention, which is intended to be limited only by the scope of the appended claims.

What is claimed is:

1. A tow trailer incorporating a trailer wheel pivoting system, said tow trailer comprising:
    a wheel assembly frame, said wheel assembly frame having an upper end and a lower end, said wheel assembly having an attitude relative to level ground;
    an axle connected to said wheel assembly frame adjacent said lower end thereof, said axle having a first end and a second end, said axle being structured to permit mounting of at least one road wheel at each of said first and second ends thereof;
    a pair of road wheels located at each of said first end and said second end of said axle for supporting the tow trailer on a surface, each said pair of road wheels having a predetermined diameter, a predetermined distance being defined between said pair of road wheels at said first end of said axle and said pair of road wheels at said second end of said axle;
    a cross-bar connected to said upper end of said wheel assembly frame, said cross-bar having an aperture at a central location thereof, said location being defined by an imaginary line being drawn perpendicularly from said cross-bar to said axle;
    tow bar means for hitching said wheel assembly frame to a tow vehicle, said tow bar means being connected to said wheel assembly frame;
    height adjustment means for selectively varying where said tow bar means attaches to said wheel assembly frame so as to selectively vary said attitude of said wheel assembly frame when said tow bar means is hitched to said tow vehicle;

an elongate trailer frame located on said wheel assembly frame adjacent said cross-bar, said elongate trailer frame having an aperture which is coincidently aligned with said aperture on said cross-bar, said elongate trailer frame having a first end and a second end, said first end and said second end of said elongate trailer frame being separated by a distance greater than said predetermined distance;

a flange located at each of said first and second ends of said elongate trailer frame, each said flange projecting perpendicularly from a side of said elongate trailer frame;

a cradle connected with each said perpendicular flange, each said cradle including a portion which is structured to hold a vehicle wheel, each said cradle being located a selected distance from said surface; and pivot pin means for pivotally holding together said wheel assembly frame with said trailer frame, said pivot pin means extending through both of said apertures in said cross-bar and said trailer frame; said elongate trailer frame being pivotable about said pivot pin means relative to said wheel assembly frame even where each said cradle is selected to be located closer to said surface than a distance defined by said predetermined diameter of each said pair of road wheels, wherein said wheel assembly frame and said cross-bar constitute a wheel assembly structure; said wheel assembly structure having a secondary aperture; said elongate trailer frame having a secondary aperture coincidently alignable with said secondary aperture on said wheel assembly structure; said tow trailer further comprising pivot stop means for inserting into said secondary apertures and thereby preventing said elongate trailer frame from pivoting about said pivot pin means relative to said wheel assembly structure.

2. The tow trailer of claim 1, further comprising a reinforcing-spacer ring connected to said cross-bar, said reinforcing ring having a central hole which is coincidently aligned with said aperture in said cross-bar.

3. The tow trailer of claim 1, further comprising lips on each said cradle for causing a vehicle wheel placed on each said cradle being selectively retained thereon.

4. The tow trailer of claim 3, further comprising a ramp releasably connectable to said lips of each said cradle for aiding each said vehicle wheel being mounted and demounted from each said cradle.

5. The tow trailer of claim 4, wherein said tow trailer further comprises elevation means for selectively adjusting said cradles relative to said perpendicular flanges so as to selectively define said selected distance between said cradles and said surface.

6. The tow trailer of claim 5, further comprising crank means connected with said tow bar means for crankably mounting said vehicle wheels on said cradles.

* * * * *